US006337434B2

(12) United States Patent
Oren-Chazon

(10) Patent No.: US 6,337,434 B2

(45) Date of Patent: Jan. 8, 2002

(54) MUSIC TEACHING INSTRUMENT

(76) Inventor: Dorly Oren-Chazon, 40 Burla Street, Apt. 27, Tel Aviv (IL), 69364

(*) Notice: Subject to any disclaimer, the term of this patent is extended or adjusted under 35 U.S.C. 154(b) by 0 days.

(21) Appl. No.: 09/731,408

(22) Filed: Dec. 6, 2000

Related U.S. Application Data

(63) Continuation-in-part of application No. 09/079,113, filed on May 14, 1998, now Pat. No. 6,215,057.

(51) Int. Cl.[7] ........................ G09B 15/08

(52) U.S. Cl. .............. 84/478; 84/470 R; 84/477 R; 84/479 A; 84/485 R

(58) Field of Search .............. 84/600, 470 R, 84/477 R, 478, 478 A, 485 R; 446/143, 318, 270, 297, 397

(56) References Cited

U.S. PATENT DOCUMENTS

| | | | |
|---|---|---|---|
| 491,833 | A | 2/1893 | Bowen et al. |
| 672,678 | A | 4/1901 | Kitching |
| 1,133,773 | A | 3/1915 | Widdle |
| 1,309,915 | A | 7/1919 | Siegel |
| 1,337,937 | A | 4/1920 | Maxwell |
| 1,571,868 | A | 2/1926 | Parsons |
| 2,731,871 | A | 1/1956 | Loughrie |
| 2,879,685 | A | 3/1959 | Page |
| 2,888,849 | A | 6/1959 | Humphrey et al. |
| 3,186,291 | A | 6/1965 | Pedicano |
| 3,196,731 | A | 7/1965 | Ingley |
| 3,477,332 | A | 11/1969 | Kreiss |
| 3,538,620 | A | 11/1970 | Kohner et al. |
| 3,595,121 | A | 7/1971 | Magers |
| 3,742,642 | A | 7/1973 | Zegers-Ten Horn |
| 3,795,989 | A | 3/1974 | Greenberg et al. |
| 3,977,292 | A | 8/1976 | Favilli et al. |
| 4,114,501 | A | 9/1978 | Tanaka |
| 4,121,488 | A | 10/1978 | Akiyama |
| 4,203,344 | A | 5/1980 | Krosnick |
| 4,271,744 | A | 6/1981 | Kulesza |
| 4,733,591 | A | 3/1988 | Kaneko et al. |
| 4,781,099 | A | 11/1988 | Koike |
| 4,827,826 | A | 5/1989 | Isashi |
| 4,924,743 | A | 5/1990 | Tsai |
| 5,011,412 | A | 4/1991 | Rosenberg |
| 5,145,447 | A | 9/1992 | Goldfarb |
| 5,188,533 | A | 2/1993 | Wood |
| 5,415,071 | A | 5/1995 | Davies |
| 5,438,154 | A | 8/1995 | Segan et al. |
| 5,501,601 | A | 3/1996 | Todokoro et al. |
| 5,540,132 | A | 7/1996 | Hale |
| 5,545,071 | A | 8/1996 | Shiraishi |
| 5,668,333 | A | 9/1997 | Horton et al. |

FOREIGN PATENT DOCUMENTS

| | | |
|---|---|---|
| CH | 658533 | 11/1986 |
| FR | 1200658 | 12/1959 |
| FR | 2680113 | 7/1991 |
| GB | 2112990 | 7/1983 |
| JP | 50-71732 | 10/1977 |

*Primary Examiner*—Marlon T. Fletcher
(74) *Attorney, Agent, or Firm*—Darby & Darby

(57) ABSTRACT

A music teaching instrument adapted to teach a player the notes of a musical scale so that the notes will be remembered. The instrument includes a sound system having a memory in which is stored audible tones of the musical scale, and means to reproduce a tone extracted from the memory so that it can be heard by the player. A keyboard is provided having a row of keys corresponding to the tones of the scale. Switching means are associated with the keys and are coupled to the sound system whereby when a key in the row is actuated by the player, a corresponding tone is then reproduced. A row of puppets is behind the row of keys, each puppet being normally inactive and in registration with a respective key. Means responsive to actuation of a key serve to activate the corresponding puppet, whereby the puppet then appears to be voicing the tone being reproduced.

18 Claims, 5 Drawing Sheets

| | | | | | | | | | | | |
|---|---|---|---|---|---|---|---|---|---|---|---|
| $R_1$ | Notes | DO | RE | MI | FA | SOL | LA | TI | DO | RE | RE |
| $R_2$ | Letters | C | D | E | F | G | A | B | C | D | E |
| $R_3$ | Numbers | 1 | 2 | 3 | 4 | 5 | 6 | 7 | 1 | 2 | 3 |
| $R_4$ | Colors | Red | Light Green | Green | Yelow | Orange | Blue | Purble | Red | Light Green | Yelow |
| $R_5$ | Sizes | | | | | | | | | | |

FIG. 7

MUSIC TEACHING INSTRUMENT

This patent application is a Continuation-in-Part of Ser. No. 09/079,113, filed on May 14, 1998, for MUSIC TEACHING DEVICE, now U.S. Pat. No. 6,215,057, which is incorporated herein by reference.

BACKGROUND OF THE INVENTION

1. Field of the Invention

The present invention relates to a music interactive toy and/or educational tool. More particularly, the present invention relates to such toys and/or educational tools for teaching people of all ages to recognize, by sound and name, the musical notes of the scale.

2. Description of the Prior Art

Music plays a major role in the lives of most people. Music is often a universal language, allowing people who do not speak the same language to nevertheless communicate in one form or another. For many people, listening to music is an enjoyable, often relaxing exercise. However, while children are taught the basics of the speaking language (a, b, c, . . . ) and the numeric language (1,2,3, . . . ), very little, if any, emphasis is placed on the musical language (do, re, mi, . . . ). In fact, even musicians, while being extremely skilled at their particular instrument, sometimes have very little knowledge concerning the musical language. Many musicians learn to play by sound without ever associating musical notes with their given names ("do", "re","mi","fa","sol", "la", and "ti").

But most people do not have the natural born talent to learn how to play an instrument without knowing the musical language. Thus, it would be extremely beneficial to begin teaching the musical scale and the names of the musical notes (i. e., "do", "re", "mi", "fa", "sol", "la" and "ti") to children at a relatively young age (even as young as under two years old), when their minds are the most receptive to new information. However, because most children have relatively short attention spans, any effective method of teaching the musical scale to children must hold their attention while simultaneously educating them.

A number of systems and aids have been proposed for teaching the musical scale to children. A form of such a device is disclosed in U.S. Pat. No. 4,114,501 to Tanaka. That device includes plural dolls, each of which has a flexible bellows and a uniquely configured air chamber and air passageway to produce a unique noise in a particular pitch or tone. This device, however, provides no means for varying the sound output by the dolls to cater to different children's interests in an effort to capture and hold their attention.

Another proposed device is disclosed in U.S. Pat. No. 5,540,132 to Hale, and includes plural puppet characters that incorporate tonal devices such as battery powered electronic devices that emit a sound in a tone which corresponds to that of the musical note with which the puppet character is associated. The tonal device is housed inside the puppet and includes a pressure sensitive switch to activate it. This device also suffers from the shortcoming that there is no way to change the output format of the sound being generated depending on the person using the device.

Accordingly, it will be apparent to those skilled in the art that there continues to be a need for an improved music teaching device for teaching people to distinguish musical notes by sound, sight and/or name simultaneously. Furthermore, there exists a need for such a music teaching device that is adaptable to the particular user of the device and to his or her interests. Also, the present invention teaches understanding the relative changes in pitch between the notes by visualizing these changes in a graduated increase in size of the colored dolls, corresponding to each note. The present invention addresses these needs and others,

SUMMARY OF THE INVENTION

Briefly, and in general terms, the present invention provides a music teaching device for teaching users to recognize particular notes by sound and for associating those notes with their musical names ("do", "re", "mi", etc.). The invention includes one or more sound generating devices operative to generate sound in a selected output format chosen from plural formats. The device provides an output format selector that allows a user to select the particular output format in which the sound will be generated. Upon selection of an output format and depression of a button corresponding with a particular pitch, the device retrieves from memory the corresponding sound bite in the format and pitch and audibly recreates the sound bite. At least one of the sound bites is the name of one of the notes; "do", "re", "mi", "fa", "sol", "la", and "ti".

Thus, the music teaching device of the present invention in one preferred embodiment comprises: plural playback buttons being manipulable to generate discrete playback signals; a memory device storing sound bites in plural pitches and in plural output formats; an output format selector with plural settings to determine the output format of the sound bite to be generated; a processor in electrical communication with the playback buttons, memory, and output format selector, the processor being responsive to manipulation of one of the buttons and setting of the output format selector to retrieve the corresponding sound bite from the memory; and a sound playback device in communication with the processor and operative to audibly reproduce the sound bite retrieved by the processor.

In an alternative embodiment of the present invention, the device includes figurines or dolls that are releasably mounted on a base unit. The dolls represent one note and the height of the dolls increase sequentially to correlate with its assigned note. Also, preferably, each doll is decorated in a particular color, with the three most dominant notes, "do", "fa" and "sol" being represented by the three most dominant colors yellow, blue and red, respectively. By coloring the dolls in accordance with yellow, blue and red, their importance within the scale, the dolls color correspond in domination sequence to the domination sequence of the notes.

In accordance with a further embodiment of the present invention, the device can create the sound bite in the basic terms of music, such as, for example, varying pitch (e.g., high, low), dynamic (e. g., piano, forte), rate or tempo (e. g., slow, fast), duration (e.g. beats per second), half-notes, etc.

Other features and advantages of the present invention will become apparent from the following detailed description, taken in conjunction with the accompanying drawings which illustrate, by way of example, the features of the present invention.

BRIEF DESCRIPTION OF THE DRAWINGS

FIG. 7 is a table showing the different expressions of a musical scale produced by the teaching device.

DETAILED DESCRIPTION OF THE INVENTION

Figure 1:
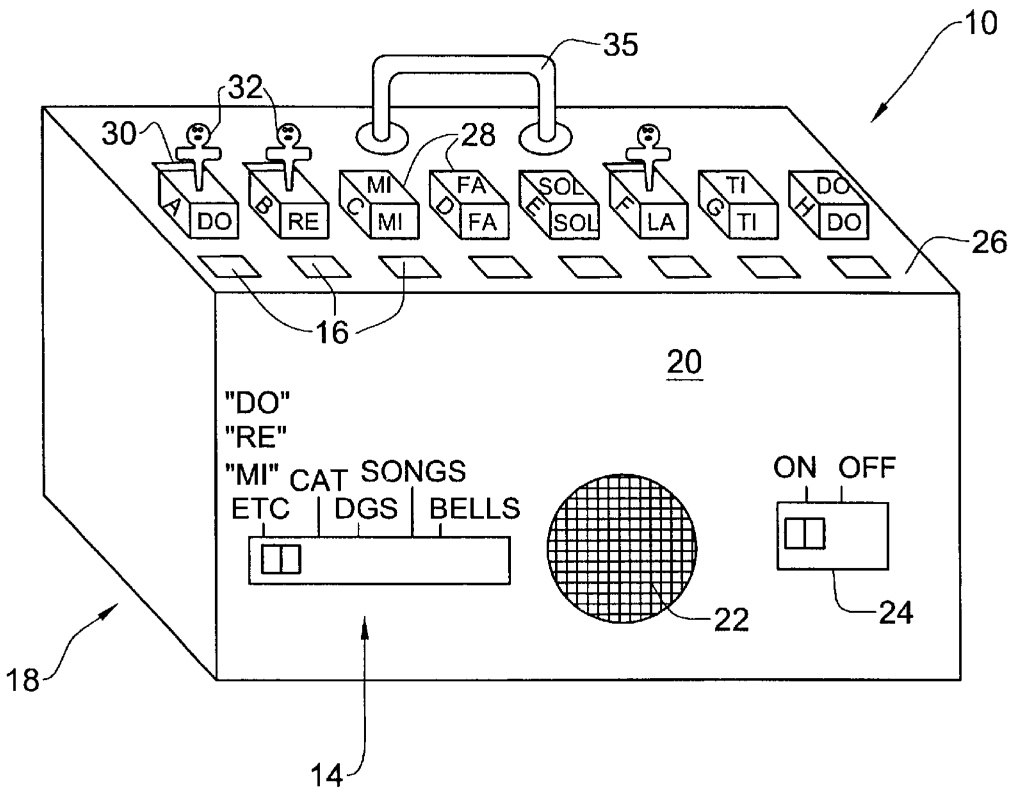
FIG. 1 is a perspective view of a preferred embodiment of the music teaching device of the present invention.
Figure 2:
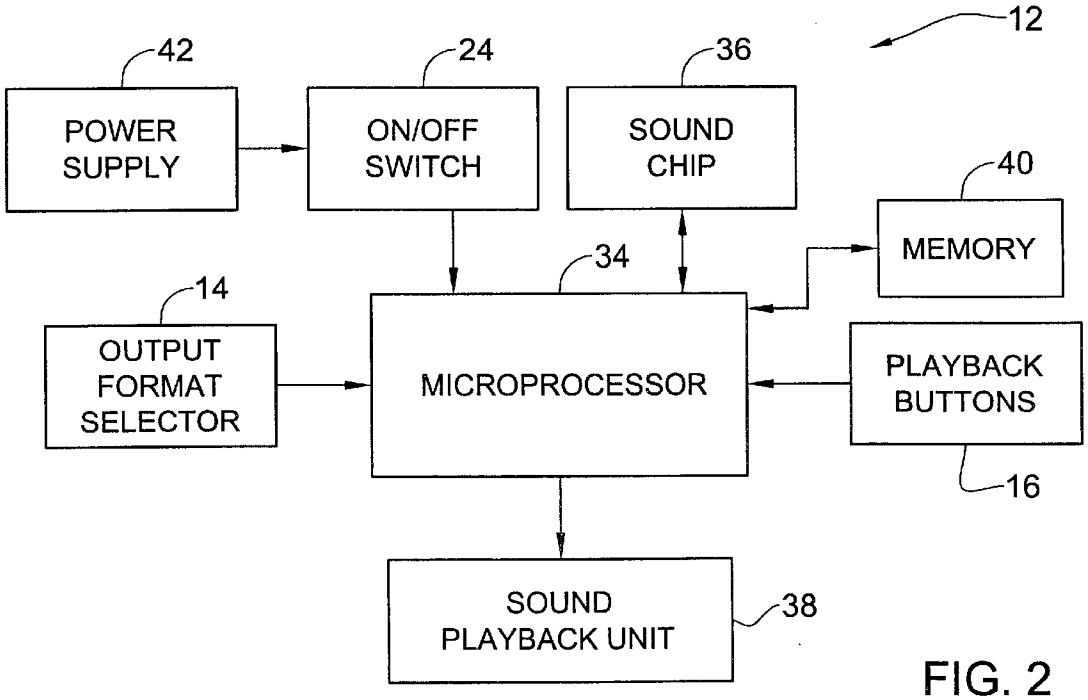
FIG. 2 is a block diagram of electronic components included in the music teaching device of FIG. 1.

In the following detailed description, like reference numerals will be used to refer to like or corresponding elements in the different figures of the drawings. Referring now to the drawings, and particularly to FIGS. 1 and 2, there is shown, generally, a music teaching device 10 comprising one preferred embodiment of the present invention. The music teaching device includes one or more sound generating devices 12, an output format selector switch 14, and plural playback buttons or switches 16. Thus, a user may select a desired output format and sequentially depress one or more of the buttons in order to generate one or more sounds in the corresponding pitches and in the selected output format.

The music teaching device 10 includes a generally rectangular housing 18. The housing includes a front face 20 in which is mounted the output format selector switch 14, a speaker 22, and an on-off switch 24, the on-off switch being operative to selectively empower the music teaching device, as described in greater detail below. The housing still further includes a top wall 26 in which is mounted the plural playback buttons 16. A handle 35 is connected, for example, to top wall 26 to permit the device 10 to be carried by a user. The top wall is further formed with plural receptacles (not shown), each of which is configured to releasably engage a respective box 28 formed with a hinged lid 30, as described in greater detail below.

The output format selector 14 is preferably in the form of a slide switch (FIG. 1) with plural settings corresponding to different outputs. As shown in FIG. 1, and meant solely as examples of possible output formats, the settings may correspond with the names of the notes ("do", "re", "ma", "fa", "sol", "la", and "ti"), a cat's meow, a dog's bark, a particular song, or a musical instrument. such as, for example, bells. It will be apparent that the settings could correspond with any desired output. For example, the sound output could be the sound of a piano or other instruments. The notes could sound as "do", "re", "mi", "fa", "sol", "la", and "ti" or as "A", "B", "C", "D", "E", "F" and "G" as the notes are currently taught in the United States. Additionally, the sound can be emitted, for example, in the legato or staccato style. Additional rhythms, as in conventional synthesizers, can be played. In addition, in place of a slide switch, a knob with multiple settings could be used. Movement of the slide switch to one of the settings results in the generation of a corresponding signal, as described in greater detail below.

Each of the buttons 16 correspond to one of the boxes 28, such that depression of one of the buttons causes the lid 30 of that box to open, allowing a doll 32 to project outwardly therefrom. Depression of the button also results in the generation of an identifiable signal transmitted to the sound generating device 12, as described in greater detail below. For example, if switch 14 is aligned with the "song" output, when a user depresses a button, that figurine will sound out the first word in the song in the particular note assigned to that button/doll. Thereafter, the next button that is depressed will result in the next word of the song being sounded in that second depressed button's assigned note. In this manner, the user will be making or composing his or her own music. Additionally, if desired, the device can include a recording device to record the music composed by the user so that the recorded music can be played back.

Each of the boxes 28 includes indicia printed thereon, preferably in the form of the names of the notes of the scale (i.e., "do", "re", "mi", etc.) on both the side and top of the box. The boxes are arranged from left to right, as shown in FIG. 1. in order from the lowest note ("do") to the highest note ("ti"). Each of the dolls 32 is formed with a different height, with the shortest doll being housed in the "do" box, and the tallest doll in the "ti" box. The eighth box is for the note "do" from the next scale. In addition, each doll is preferably colored with a different color to assist a user in associating the dolls with the different musical notes. The higher the note, the larger or higher the doll. Preferably, each doll is decorated in a particular color, with the three most dominant notes "do", "fa" and "sol" being represented by the three most dominant colors; yellow, blue and red, respectively. The remaining notes can be represented by sequentially less dominant colors. For example, "re", "mi", "la" and "ti" are preferably represented by dark green, light green, orange and purple. "Do" from the next scale or octave would be light blue.

Referring now to FIG. 2, there is shown a block diagram of the electronic components included in the sound generating device 12. The sound generating device includes a microprocessor 34, a sound bite storage device 36, preferably in the form of a sound chip, a sound playback unit 38, and memory 40. The special features of the sound generating devices are implemented, in part, by software programs stored in the memory 40. The software programs are stored in one or more preselected data files and are accessible by the processor, the function of which is described in greater detail in connection with FIG. 3. The memory preferably takes the form of a non-volatile memory device, such as a magnetic or optical storage unit or the like.

The sound chip 36, of well known design, includes a standard digital memory unit (not shown) and is controlled by the processor 34 to access and retrieve a particular sound bite data file stored in the memory unit at a location indicated by an entry in an association table included in the memory of the sound chip (FIG. 5), which is discussed in more detail below. Thus, the proper sound bite may be obtained by referring to the association table and looking for the user-selected parameters. Alternatively, a sound card or other similar device could be utilized in place of the sound chip.

The sound playback unit 38 includes the speaker 22 mounted on the front face 20 of the housing 18, an amplifier, and a digital-to-analog converter to convert the digital sound data retrieved from the sound chip 36 into an analog signal. The amplifier then amplifies the converted analog signal and transmits the amplified analog signal to the speaker for playback.

The on-off switch 24 is operative to selectively transmit power from a power supply 42 to the microprocessor 34. The power supply is preferably a battery, but may take virtually any other form.

Figure 3:
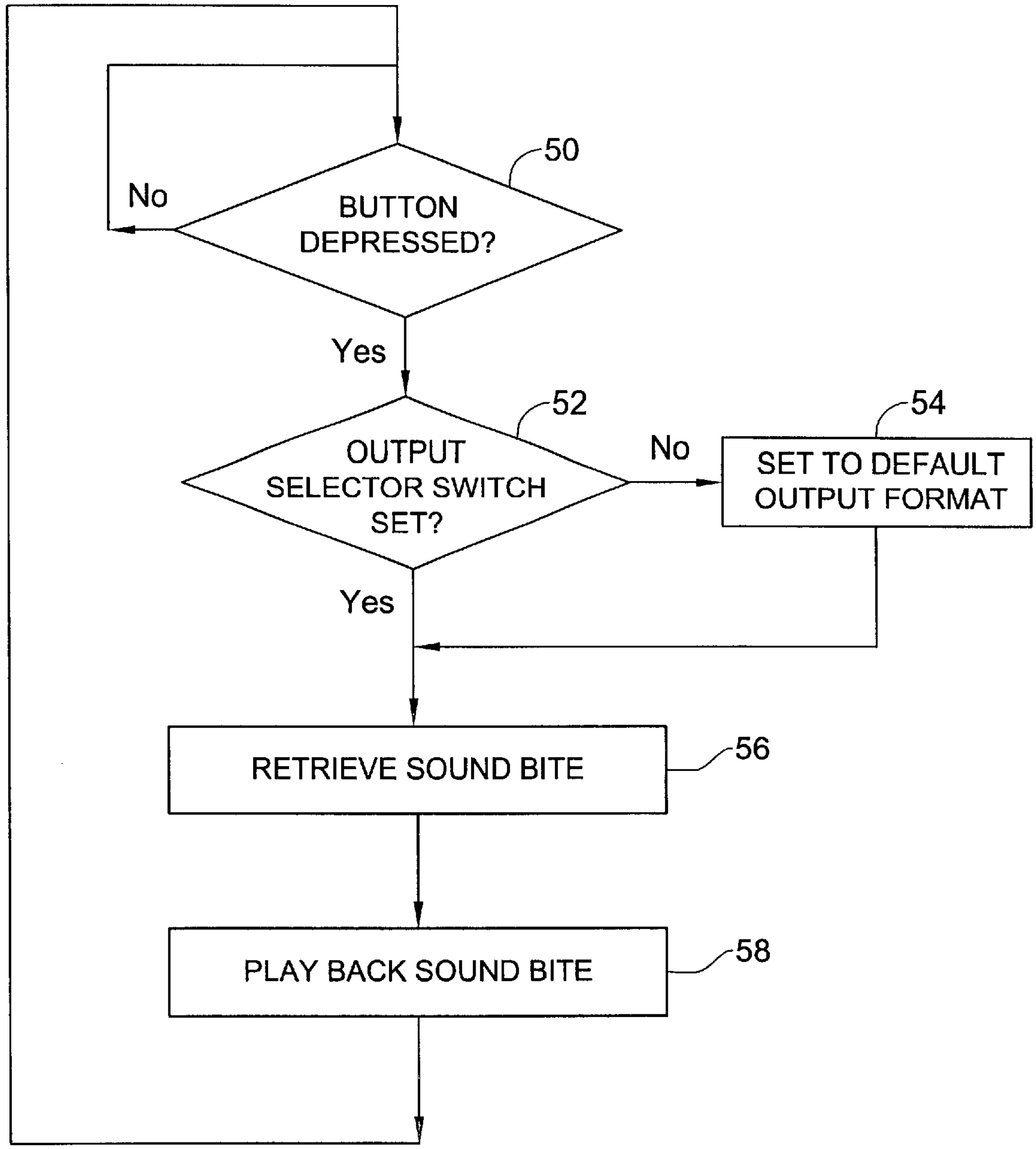
FIG. 3 is a flow chart of the operation of the music teaching device of FIG. 1.

Referring now to FIG. 3, the operation of the music teaching device 10 will be described in greater detail. After the device has been actuated by moving the on-off switch 24 to the "on" position, the processor 34 waits for one of the playback buttons 16 to be depressed, at query block 50. Once one of the playback buttons has been depressed, operation flows to query block 52, and the processor determines whether the output format selector 14 has been set to a particular output format. If the selector has been set to an output format, then operation flows to function block 56, and the processor retrieves from the sound chip 36 the corresponding sound bite in the desired output format and pitch. If not, then at function block 54 a default output format is selected, and operation flows to function block 56 where the processor retrieves the corresponding sound bite in the default output format. The default output format could be the actual name of the note in the note's pitch, or any other output. The sound bite retrieval is preferably accomplished by utilizing the association table, with the processor matching the data corresponding to the selected output format and particular depressed button with the data in the association table to determine the location of the corresponding sound bite. The processor then retrieves that sound bite and transmits the digital sound bite data to the playback unit 38. At function block 58, the retrieved sound bite is played back by the sound playback unit. The digital sound bite data is converted to an analog signal, amplified, and played through the speaker 22. After the sound bite has been played back, operation flows back to query block 50 to await depression of another one of the buttons 16.

It will be apparent that the music teaching device 10 of the present invention could take many different forms. For example, the device could be embodied in a personal computer, with the computer's microprocessor being programmed to perform the routine described above in connection with FIG. 3. The computer's keyboard or mouse could be used to select the output format and the particular note to be audibly played back. The digital sound bites could be stored in the computer's memory or on a disk that is accessed by the microprocessor through its disk drive.

In a preferred embodiment, each doll 32 includes a separate playback unit 38 and sound chip 36 and is removable from its box 28. Thus, the dolls can be removed from the housing and can still generate notes in their respective pitches upon actuation of a switch located on each doll.

Figure 4:
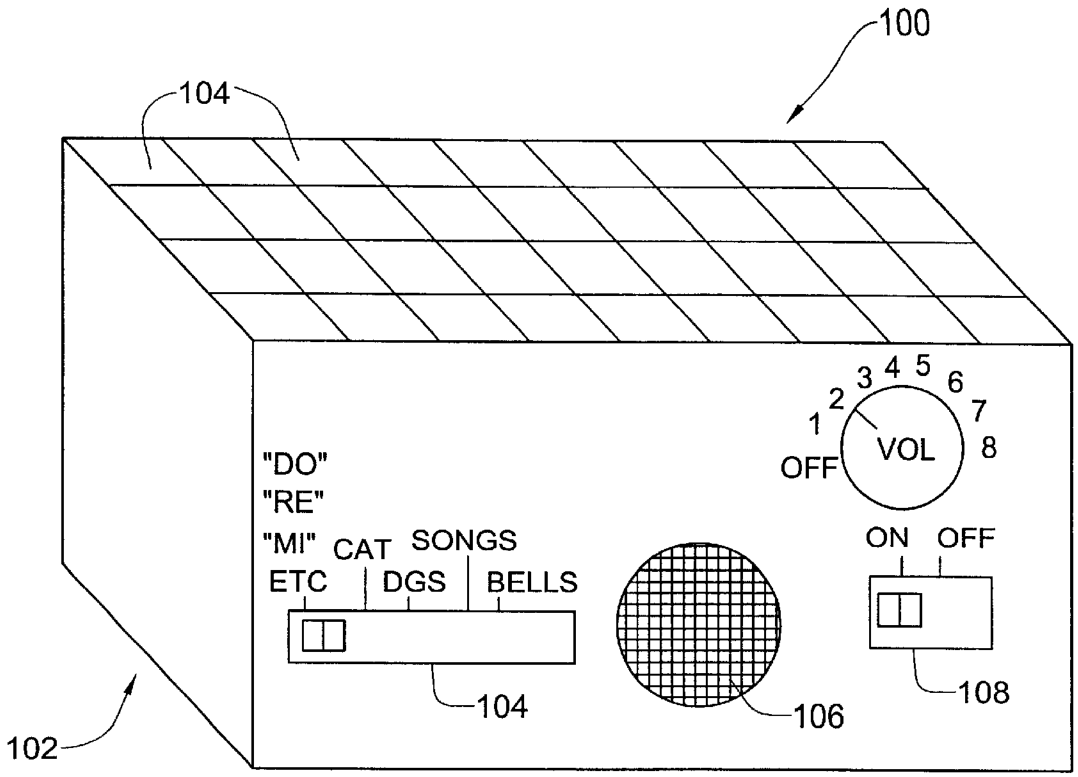
FIG. 4 is a perspective view of an alternative embodiment of the music teaching device of the present invention.

Referring now to FIG. 4, there is shown an alternative embodiment of the music teaching device 100 of the present invention. The device 100 includes a housing 102, an output format selector 104, speaker 106, and an on-off switch 108, all of which are identical to the components included in the device 10 shown in FIG. 1. In place of the buttons 16, boxes 28, and dolls 32, the device 100 includes a top surface 110 partitioned into plural discrete segments 112, each of which corresponds to a particular note. The device is preferably provided with eight columns corresponding to the seven notes (plus the first note "do" being repeated in the next scale), and includes plural rows corresponding to the different octaves of the major scale. Each segment is sensitive to touch (i.e., it either comprises a depressible switch or a touch-sensitive display), such that selection of one of the segments causes the device to audibly generate the corresponding sound bite, as described above.

Figure 5:
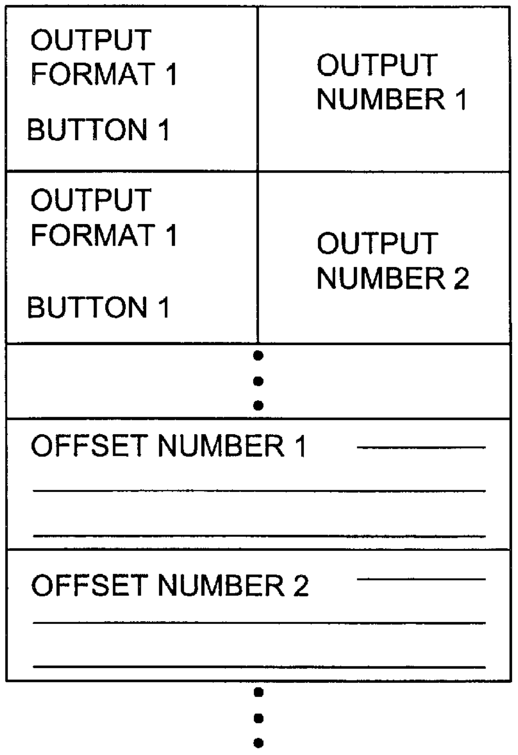
FIG. 5 is a schematic diagram of a file storage architecture including an association table according to the present invention.

FIG. 5 shows a file storage architecture 120 comprising an association table section 122 and a sound data storage section 124 used by the microprocessor 34 as described above to locate the proper sound bite. The association table section 122 comprises a series of address lines 126, each of which links an output format and button with a corresponding sound bite by means of an offset address designator 128 which points to a predefined start site in the remainder of the memory where the corresponding sound bite data is stored. Thus the microprocessor 34 simply accesses the association table and searches for the matching output format and button data and, once found, determines the offset location for the desired sound bite. The sound data storage section 124 comprises a series of memory blocks 130, each of which stores sound information comprising a sound bite.

From the foregoing, it will be apparent that the music teaching device 10 of the present invention provides an educational, interactive device for teaching a user to recognize a note by sound, and to associate the note with the note's name. In addition, the music teaching device provides plural output formats to accommodate different user's interests.

While forms of the invention have been illustrated and described, it will be apparent to those skilled in the art that various modifications and improvements may be made without departing from the spirit and scope of the invention. Thus, the present invention is not intended to be limited by the illustrative examples set forth herein. For example, a user can test him or herself by utilizing the device in a "pick the note" mode. The device can randomly sound an audible note, and, thereafter, the user must pick the correct doll or other button or switch that corresponds to the sounded note. In this manner, the user learns to identify notes by sound and by association to a particular size and/or color of a doll. The device can include a record feature so that the sound bites played by the user can be recorded and played back for repeated entertainment. The device can also be operated by remote control, including remote operation of the dolls regardless of whether they are in or out of the base. Further, the device can be input as a computer program or game so that the dolls are illustrated on the screen. The dolls can be actuated by clicking on the doll to hear the preselected output format. Thus, the mouse of the computer can be the playback button and can be used to select the output format. Further, while only one octave has been illustrated for the device, it is clear that two, three or more octaves of notes may be utilized by the device in accordance with the present invention. Additionally, the device may play half-notes.

Music-Teaching Instrument for Pre-School Children

The capacity of the human brain to remember in detail for a prolonged period depends on its ability to place in storage, to process and to retrieve information in whatever form it is entered into the brain. An individual can best understand and remember information presented to him metaphorically as well as literally; that is by way of analogy and counterparts.

An eminent thinker is reported as saying that "Man's first great invention was the wheel—his second, the Metaphor". Metaphor is a vital aid to memory and human communication. Thus it is far easier to appreciate and remember the shape of an object when described as being "pear-shaped" than when described in the language of geometry.

Our concern in the present invention is with teaching the notes of the musical scale to a pre-school child, and to give an example of where metaphor comes into play, we shall assume that a kindergarten teacher wishes to teach the child the word BIG and what it means. This can best be done by the teacher in the following manner:

a) By writing the letters of the word on a blackboard.

b) By vocally pronouncing the word BIG so that the child knows how it sounds.

c) By demonstrating how BIG differs from SMALL by making a loud sound and then a soft sound.

d) By showing the child an Apple (Big) next to a Cherry (Little).

A child in this situation will enter into his memory the vocal and visual aspects of the work BIG and in doing so he is not likely ever to forget this word and its meaning.

UK Patent GB 2112990 takes a similar multifaceted approach toward teaching a child the notes of the musical scale, knowledge which is a precursor to learning, how to play music on an instrument. The educational toy disclosed in this British patent, is adapted to teach a child the notes of the musical scale and the counterparts thereto in terms of alphabetic letters and Arabic numerals.

This teaching toy includes a floor mat divided into a rectangular array of squares which are designated by letters corresponding to the notes of the musical scale. When a child steps on a particular square on the mat, he then hears the musical tone represented by the letter displayed on the square. Associated with the mat is a seven-segment visual display which presents the number of the tone on the scale then being played. Thus a child playing with this educational toy is taught the notes of the musical scale and their counterpart letters and numbers.

However, the toy disclosed in this British patent which includes a foot-operated mat has a serious drawback in that it does not simulate a typical musical instrument having a keyboard. Hence the British toy does not prepare the child to learn how to play a conventional keyboard instrument.

This drawback is overcome in the keyboard operated musical instrument disclosed in U.S. Pat. No. 4,733,591 to Kanebo et al. in which the instrument includes a keyboard circuit for generating a pitch data signal which designates the note name of a musical tone to be produced and a speech signal generator for generating a speech signal which tells in a human voice the name of the designated musical tone. Also, included is a multiplexed processing circuit for time-divisionally processing the pitch data signal and the speech signal; and a sound signal-producing circuit for producing the musical tone and the human voice in accordance with the processed output from the processing circuit Thus the instrument speaks the names of the tones as it produces the musical tones.

Inasmuch as a music-teaching instrument in accordance with the invention requires tone and speech generators, and other circuits similar to those included in the Kanebo et al. patent, the entire disclosure of this patent is incorporated herein by reference.

The practical drawback of a music-teaching instrument of the type disclosed in the Kanebo et al. patent is that for purposes of teaching the musical scale to a pre-school child, it lacks an essential component of the teaching process; namely, the active participation of a teacher or a surrogate therefor.

Basic information on an elementary level such as Arabic numerals and the letters of the alphabet cannot be self-taught by a pre-school child, even though it is best that he acquire this information before entering the first grade. A pre-school child can only be taught by a parent or kindergarten teacher to whom the child is attentive.

One teaching basic information to a pre-school child need not be human but can take a humanoid form, such as a puppet. The advantage of an animated puppet in the role of a teacher is that it converts the learning process into a play experience and thereby sustains the interest of the child.

Thus the most successful TV educational program for pre-school children in the MUPPETS in which manipulated puppets teach young viewers of this program the letters of the alphabet as well as the numbers, one-at-a-time by means of counterparts. Thus to teach the number 3, the number is displayed by the puppet in its Arabic number form, it is spoken by the puppet and also is demonstrated in the form of three blocks and other trios. In this way, the child is not only taught what number 3 looks like and how it sounds but also what it means.

The use of puppets as a means to teach children foreign languages is disclosed in the periodical Puppetry in Practice (Fall 1999 edition) published by the School of Education, Brooklyn College CUNY. An instrument in accordance with the invention is adapted to teach children the language of music, this being carried out by a gang of puppets, each puppet being assigned the task of teaching a single note in the musical scale.

In a music teaching instrument for a pre-school child in accordance with the invention, a child will not only hear the tones of the musical scale but will also be made to recognize that the pitch of each tone increases progressively as one goes up the scale. This progressive increase is expressed by alphabetical and numerical counterparts as well as by changes in color.

By pre-school children is meant those in the range of 2 to 6 years of age. The instrument shown in FIG. 6, generally identified by numeral 150, is provided with a sound system that may be similar to that included in the system shown in FIGS. 1 and 2. It therefore may include a sound chip, a microprocessor and other electronic circuits necessary to generate the spoken sounds and musical tones produced by the instrument when its keys are activated. Or the sound system may be of the type disclosed in the above-identified Kanebo et al. patent.

Figure 6:
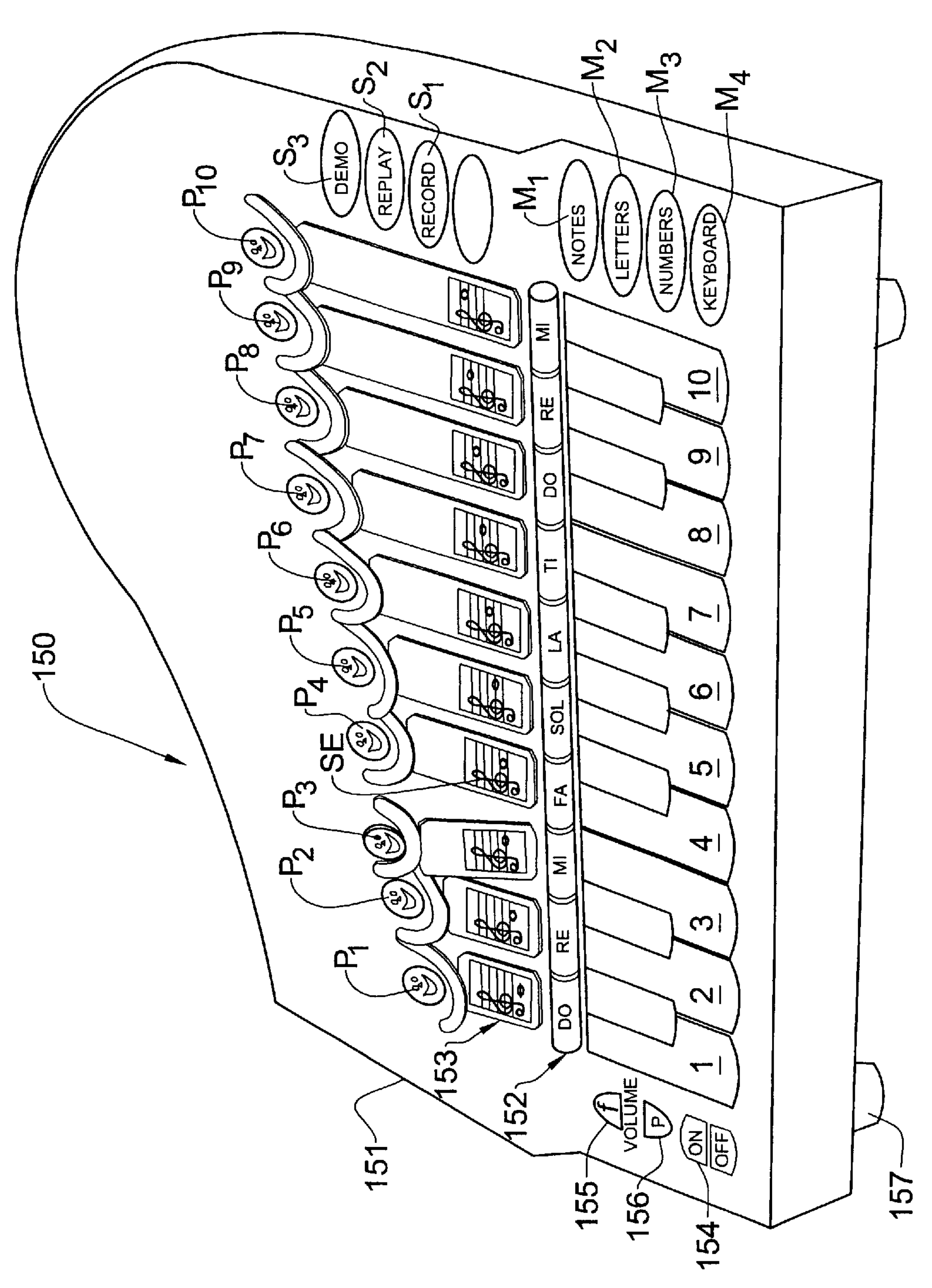
FIG. 6 is a perspective view of another embodiment of a music teaching device for pre-school children.

However the format of the instrument shown in FIG. 6 differs from that shown in FIG. 1 in that it resembles in appearance a keyboard-operated piano that not only produces the tones of the musical scale but also four different counterparts thereto. The collective effect of accompanying each tone with four counterparts is to greatly enhance the ability of the child playing the instrument to recognize and long remember the tones of the musical scale.

Instrument 150 is housed in a molded, high-strength plastic casing 151 having a piano-like shape. On the flat horizontal face of the casing adjacent the planar front side thereof is a keyboard having a row of ten keys identified by numbers 1 to 8, followed by numbers 2 and 3. The keys numbered 1 to 8 represent the eight tones of a musical octave composed of the tones DO-RE-MI-FA-SOL-LA-TI-DO. The following two keys 2 and 3 represent the beginning of the next octave. Hence the tones produced by successively operating the keys are of progressively higher pitch.

Directly above the row of keys on the keyboard is a row 152 formed by a series of cylindrical signs which identify the tones (DO,RE,MI, etc.) generated when the keys are activated. The sign row 152 not only identifies the tones in the scale but also creates a barrier between the keyboard and a row 153 of two-dimensional humanoid figures $P_1$ to $P_{10}$ behind the barrier and parallel to the keyboard. FIGS. $P_1$ to $P_{10}$ in row 153 are puppet-like, each figure being aligned with a respective key on the keyboard. The two-dimensional puppets $P_1$ to $P_{10}$ are of progressively greater length or height corresponding to the increasing pitch of the tones produced when the keys are successively actuated.

Each puppet has printed on its torso a staff ST displaying the staff position of the tone represented by the puppet. The puppets in the row are normally retracted to lie flat on the horizontal face of the instrument casing. But when a key is actuated to produce a tone in the musical scale, the related puppet then stands up to face the player and to make it appear that the tone is coming from him. Thus each puppet functions as a virtual teacher whose subject is limited to a respective tone in the scale and the counterparts thereto.

The puppets are hingedly mounted and are spring biased so that they normally are retracted to lie flat on the casing. The mechanism for erecting each puppet can be an electromagnetic actuator which is energized by a key switching action, the actuator serving to swing the puppet upwardly to an erect position.

Housed within the casing of the instrument is a sound system that includes a memory in which is digitally stored (a) the tones of the musical scale related to the ten keys on the keyboard, (b) the spoken speech sounds of the alphabetical letters related to these tones, and (c) the spoken speech sounds of the Arabic numerals related to these tones.

Preferably the recorded tones and the spoken sounds of the numbers and letters are derived from the singing and speaking voice of a music teacher. As previously explained, an effective teaching process for pre-school children depends on there being a virtual or surrogate teacher. Hence what the child hears when playing the instrument is the voice of his teacher-puppet, the higher the pitch of the tone, the taller is its teacher.

In order to make it seem that the voice is coming from a puppet, the loudspeaker of the system is mounted at the bottom of the instrument casing which is raised above the table by short legs 157, so that the sound then actually emanates from below the puppet. The underside of casing 151 serves as the baffle board for the speaker.

The sound of a human voice produced when a key is operated, whether the sound is a tone in the musical scale, a spoken number or a spoken letter, depends on the operating mode of the instrument. This is selectively determined by mode switch buttons M1, M2 and M3. When button M1 is pressed by the player, the instrument then operates in a NOTES mode. In this mode, when a key is actuated, this causes the sound system to extract from its memory and then reproduce a particular tone in the scale. Thus when key 3 is actuated by a player, puppet P3 then stands up and sings out the tone Mi. But when key 5 is pressed, puppet P5 is raised to sing the tone Sol.

When mode switch M2 is operated, it puts the instrument in its LETTERS mode. Hence each time a key is actuated by the player, he hears the voice of the puppet who then stands up, speaking the letter related to this key. Thus if the player actuates key 5, the player then hears the puppet say the letter G representing the tone La. When mode switch M3 is operated to put the instrument in the Numbers mode, then when say key 4 is pressed, one hears the raised puppet P4 speak the number 4 representing the note Fa.

The instrument is color-coded, each key and its related puppet having the same color which depends on the position of the corresponding tone in the musical scale. For example, the colors may be in the following spectrum:

KEY 1—RED
KEY 2—LIGHT GREEN
KEY 3—GREEN
KEY 4—YELLOW
KEY 5—BLUE
KEY 6—ORANGE
KEY 7—PURPLE

The note signs in row 152 are correspondingly colored. Thus the child is taught by the instrument to understand that each tone in the musical scale is distinctive, just as colors related thereto are distinctive.

The instrument includes a volume control 155 to raise the volume to a "Forte" level, and a volume control 156 to lower the volume to a "Pianissimo level". And it is provided with an On-Off switch 154.

When the child simply wishes to play the instrument in the manner of a conventional electronic instrument, he then presses button M4 to put the instrument in a KEYBOARD mode. In this mode, the keyboard is associated with a sound card whereby operation of the keys then produces the tones of an organ or other keyboard instrument. If now the player wishes to record what he is playing in the KEYBOARD mode, he then actuates RECORD switch S1. The system then proceeds to record whatever is then being played by the child. To replay the tune or whatever else the child has recorded, one then presses REPLAY switch S2.

Also stored in the instrument are existing multi-track musical recordings for pre-school children, such as simple tunes and songs. To hear these recordings, one presses the DEMO switch button S3. In the DEMO mode, the keys on the keyboard then function as a selector for the recorded sound tracks.

The table illustrated in FIG. 7 exhibits the multifaceted character of the music teaching instrument. The top row R1 of the table identifies the series of tones (Do, Re, etc.) produced by the ten keys of the keyboard. Row R2 identifies the corresponding alphabetical letters. In Row R3 we see the corresponding numerals, while R4 identifies the distinctive colors associated with the notes. And in Row R5 we see represented the different pitches of the notes expressed in terms of the varying height sizes of the puppets associated with the notes.

Thus the pre-school child who plays this instrument by means of its keyboard is able to produce the tones of the music scale, each tone being expressed by four different counterparts which collectively function to impress the tones on the child's memory. And because the task of teaching each tone to the child is assigned to a teacher-puppet whose voice sings the tones and speaks the numerals and letters, this serves to sustain the child's interest in being taught the tones of the musical scale.

In practice, instead of switching from a tone to a letter and then to a number, the system may be arranged so that when a key is pressed, then one hears the related tone followed by its letter and then by its number.

Modifications:

Instead of providing in an instrument of the type shown in FIG. 6 a gang of two-dimensional puppets hinged to a horizontal panel the puppets normally lying flat and swinging to an erect position when the corresponding keys are actuated, the puppets may be in a jack-in-the-box arrangement.

In this arrangement, each puppet in an erect position is concealed in a box placed below the top panel and closed by a lid. When a key is pressed, the lid or trap door of the box containing the corresponding puppet is caused to swing open to release the puppet which now rises out of the box. But when the key is released, then after a predetermined interval, the puppet is pulled back into its box.

To simplify the instrument and avoid the need for mechanisms for erecting and retracting the puppets and the danger of an erect puppet being broken off, the puppets in the gang may be in an array affixed to an upwardly inclined platform; hence all of the puppets can be seen and are never concealed or retracted. But they are normally inactive.

In order to activate these puppets in response to the keys on the keyboard, a lighting system is provided which when a particular key is pressed this causes the corresponding puppet to light up and glow in a color corresponding to the color of the pressed key.

To this end, the puppets are molded in acrylic plastic or similar highly transparent material having good light transmitting characteristics which lends itself to edge-lighting. Associated with the lower edge of each two-dimensional puppet is a light bulb which when turned on illuminates the entire puppet.

Interposed between the edge of the plastic puppet and the bulb is a color filter which imparts to the rays emanating from the bulb the same hue as the color of the corresponding key. Hence when the red key is depressed, one then sees a puppet glowing in red. And one now hears from this illuminated and active puppet, the tone produced by the key.

As in the other embodiments, the gang of puppets is of progressively increasing height to indicate the increasing pitch of the tones. Again it must be stressed that unique to this instrument for teaching the language of music is that each puppet in the gang teaches a single note in the musical scale and that the color and height of the puppet are associated with this note.

In practice, the keyboard may have more than an octave and a portion of the next octave, as shown in FIG. 6. It may have two or more octaves or even as many octaves as a piano.

An instrument in accordance with the invention may be created by means of an existing music synthesizer computer having a sound card in which is digitally stored the tones of the music scale, and means to extract and reproduce these tones. By means of appropriate software, the keyboard and row of puppets shown in FIG. 6 are displayed on the CRT screen of the computer, the computer being arranged so that when a player touches the video screen to engage a key thereon, this causes the related puppet to light up to appear to stand up and then voice the tone related to the actuated key. Thus an existing computer functioning as a music synthesizer can be converted to create as it were, a vertical music teaching instrument in accordance with the invention.

While there has been disclosed and illustrated preferred embodiments of a music teaching instrument in accordance with the invention, it is to be understood that many changes may be made therein without departing from the spirit of the invention. Thus the instrument may be designed to teach adults the notes of the musical scale. In that design, the puppets can be two-dimensional figures of famous composers, such as Bach, Beethoven, Brahms and Mozart in different heights. A Bach puppet is particularly appropriate, for it is a historical fact that he taught the language of music to his many children, two of whom became composers of note.

What is claimed is:

1. A music teaching instrument adapted to teach a player the notes of a musical scale so that the notes will be remembered the instrument comprising:

A. a sound system having a memory in which is stored audible tones of the musical scale, and means to reproduce a tone extracted from the memory so that it can be heard by the player;

B. a keyboard having a row of keys corresponding to the tones of the scale, and switching means associated with the keys and coupled to the sound system whereby when a key in the row is actuated by the player, a corresponding tone is then reproduced;

C. a row of humanoid figures behind the row of keys, each figure being normally retracted and in registration with a respective key, and D. means responsive to actuation of a key to cause the corresponding figure to rise up to face the player, whereby the figure then appears to be voicing the tone being reproduced.

2. An instrument as set forth in claim 1, in which stored in the memory of the sound system are spoken sounds of letters corresponding to the tones of the scale, and further including means operative when a key is actuated to then reproduce the spoken letter corresponding to this key.

3. An instrument as set forth in claim 1, in which stored in the memory of the sound system are spoken sounds of numbers corresponding to the tones of the scale, and further including means operative when a key is actuated to reproduce the spoken number corresponding to this key.

4. An instrument as set forth in claim 1, wherein the keys in the row thereof each have a distinctive color whereby the player learns to associate the tones of the scale with the colors of the keys.

5. An instrument as set forth in claim 1, in which the figures in the row are of progressively increasing height in accordance with progressively higher pitches in the tones of the scale.

6. An instrument as set forth in claim 1, in which the figures are two dimensional and in a retracted state are flat on a horizontal surface of the instrument.

7. An instrument as set forth in claim 1, which is operative in a keyboard mode in which it can then be played by the player like a conventional electronic instrument.

8. An instrument as set forth in claim 7, including means to record the tones produced by the player when playing a time on the keyboard in the keyboard mode, and to replay the recorded tune.

9. An instrument as set forth in claim 1, further including means to increase or decrease the volume of the sounds produced thereby.

10. An instrument as set forth in claim 1, in which the tones stored in the memory are tones which are sung by a singer.

11. A music teaching instrument comprising:

A. a sound system having a memory in which are stored the following sounds:

(a) audible tones of a musical scale;

(b) spoken sounds of letters corresponding to the tones of the scale;

(c) spoken sounds of numbers corresponding to the tones of the scale; and selector means associated with the memory to extract therefrom the sounds of a tone, a spoken letter sound or a spoken number and to reproduce the selected sounds so that it can be heard by the player;

B. a keyboard having a row of keys corresponding to the tones of the scale, and switching means associated with the keys and coupled to the sound system whereby when a key is actuated by the player, the corresponding sounds are then reproduced;

C. a row of normally-retracted humanoid figures mounted behind the keyboard, each figure being in registration with a respective key in the row thereof; and D. means responsive to actuation of a key to cause the corresponding figure to rise up so that it then faces the player and appears to be issuing the selected sounds then being reproduced.

12. An instrument as set forth in claim 11, in which the sound system is housed in a piano-shaped casing, and the keyboard is parallel to a planar front wall of the casing.

13. An instrument as set forth in claim 12, in which the row of figures is parallel to the row of keys.

14. An instrument as in claim 13, in which the keys in the row thereof are in different colors and the figures in the row thereof are in matching colors.

15. A music teaching instrument adapted to teach a player the notes of a musical scale so that the notes will be remembered, the instrument comprising:

A. a sound system having a memory in which is stored audible tones of the musical scale, and means to reproduce a tone extracted from the memory so that it can be heard by the player;

B. a keyboard having a row of keys corresponding to the tones of the scale, and switching means associated with the keys and coupled to the sound system whereby when a key in the row is actuated by the player, a corresponding tone is then reproduced;

C. a row of puppets behind the row of keys, each puppet being normally inactive and in registration with a respective key, and D. means responsive to actuation of a key to activate the corresponding puppet, whereby the puppet then appears to be voicing the tone being reproduced.

16. An instrument as set forth in claim 15, in which the puppets are formed of transparent plastic material and in the inactive state are dark, each puppet when activated being illuminated.

17. An instrument as set forth in claim 16, in which the puppet is illuminated by light rays having a distinctive hue, and the key which activates the puppet has the same hue.

18. An instrument as set forth in claim 1 in which the audible tones are digitally stored in a sound card included in a music synthesizer computer having a video screen and means to extract the tones of a musical scale from the sound card and to reproduce these tones, further including software to display on the screen the keyboard and the row of figures, and means actuated when a player touches the screen to engage a key and thereby extract from the sound card and reproduce the related tone, and to cause the related figure to light up or appear to become erect so that the tone seems to emanate from the activated figure.

* * * * *